(12) United States Patent
Davis et al.

(10) Patent No.: US 7,490,480 B2
(45) Date of Patent: Feb. 17, 2009

(54) VARIABLE SPEED REFRIGERATION SYSTEM

(75) Inventors: Kenneth E. Davis, Berwyn, IL (US); Alvin V. Miller, Swisher, IA (US); Joseph H. Ryner, New Windsor, IL (US); Kyle B. VanMeter, Coralville, IA (US); Robert L. Wetekamp, Cedar Rapids, IA (US)

(73) Assignee: Maytag Corporation, Benton Harbor, MI (US)

( * ) Notice: Subject to any disclaimer, the term of this patent is extended or adjusted under 35 U.S.C. 154(b) by 658 days.

(21) Appl. No.: 10/798,286

(22) Filed: Mar. 12, 2004

(65) Prior Publication Data

US 2004/0187503 A1 Sep. 30, 2004

Related U.S. Application Data

(60) Provisional application No. 60/454,526, filed on Mar. 14, 2003.

(51) Int. Cl.
*F25D 17/00* (2006.01)
*F25B 49/00* (2006.01)

(52) U.S. Cl. .................... 62/180; 62/187; 62/228.4
(58) Field of Classification Search ................ 62/187, 62/186, 179, 180, 228.4
See application file for complete search history.

(56) References Cited

U.S. PATENT DOCUMENTS

| 3,005,321 A | 10/1961 | Devery |
|---|---|---|
| 3,447,747 A | 6/1969 | McHale |
| 3,559,422 A | 2/1971 | Holzer |
| 3,630,046 A | 12/1971 | Boor |
| 3,747,361 A | 7/1973 | Harbour |
| 3,759,051 A | 9/1973 | Ohnishi |
| 3,811,292 A | 5/1974 | Hoenisch |
| 3,815,378 A | 6/1974 | Hoenisch |
| 4,009,590 A | 3/1977 | Webb et al. |
| 4,009,591 A | 3/1977 | Hester |
| RE29,621 E | 5/1978 | Conley et al. |
| 4,177,649 A | 12/1979 | Venema |
| 4,257,238 A | 3/1981 | Kountz et al. |
| 4,282,720 A | 8/1981 | Stottmann et al. |
| 4,315,413 A | 2/1982 | Baker |
| 4,358,932 A | 11/1982 | Helfrich, Jr. |
| 4,467,618 A | 8/1984 | Gidseg |
| 4,481,787 A | 11/1984 | Lynch |
| 4,485,635 A | 12/1984 | Sakano |
| 4,646,531 A | 3/1987 | Song |
| 4,646,534 A | 3/1987 | Russell |

(Continued)

FOREIGN PATENT DOCUMENTS

JP 404302976 A 10/1992

(Continued)

*Primary Examiner*—Marc E Norman
(74) *Attorney, Agent, or Firm*—Kirk Goodwin; Michael D. Lafrenz

(57) ABSTRACT

A refrigerator incorporates a variable speed refrigeration system including a variable speed compressor, a variable speed evaporator fan, a variable speed fresh food compartment stirring fan and a variable position damper. Various temperature sensors are provided to sense system parameters which are used by a controller to regulate each of the variable components in order to compensate for temperature changes within at least one refrigerator compartment in a highly effective, energy efficient and synergistic manner.

17 Claims, 3 Drawing Sheets

U.S. PATENT DOCUMENTS

| | | | |
|---|---|---|---|
| 4,662,185 A | 5/1987 | Kobayashi et al. | |
| 4,732,010 A | 3/1988 | Linstromberg et al. | |
| 4,734,628 A | 3/1988 | Bench et al. | |
| 4,765,150 A | 8/1988 | Persem | |
| 4,819,442 A | 4/1989 | Sepso et al. | |
| 4,834,169 A | 5/1989 | Tershak et al. | |
| 4,843,833 A | 7/1989 | Polkinghorne | |
| 4,873,649 A * | 10/1989 | Grald et al. | 700/276 |
| 4,959,969 A | 10/1990 | Okamoto et al. | |
| 5,018,364 A | 5/1991 | Chesnut et al. | |
| 5,172,566 A | 12/1992 | Jung et al. | |
| 5,201,888 A | 4/1993 | Beach, Jr. et al. | |
| 5,228,300 A | 7/1993 | Shim | |
| 5,231,847 A | 8/1993 | Cur et al. | |
| 5,253,483 A | 10/1993 | Powell et al. | |
| 5,255,529 A | 10/1993 | Powell et al. | |
| 5,255,530 A | 10/1993 | Janke | |
| 5,257,508 A | 11/1993 | Powell et al. | |
| 5,269,152 A | 12/1993 | Park | |
| 5,375,428 A | 12/1994 | LeClear et al. | |
| 5,377,498 A | 1/1995 | Cur et al. | |
| 5,460,009 A | 10/1995 | Wills et al. | |
| 5,548,969 A | 8/1996 | Lee | |
| 5,555,736 A | 9/1996 | Wills et al. | |
| 5,586,444 A | 12/1996 | Fung | |
| 5,678,416 A | 10/1997 | Yoo et al. | |
| 5,711,159 A * | 1/1998 | Whipple, III | 62/82 |
| 5,715,693 A | 2/1998 | Van Der Walt et al. | |
| 6,038,874 A | 3/2000 | Van Der Walt et al. | |
| 6,196,011 B1 * | 3/2001 | Bessler | 62/186 |
| 6,216,478 B1 * | 4/2001 | Kang | 62/228.4 |
| 6,286,326 B1 * | 9/2001 | Kopko | 62/179 |
| 6,598,410 B2 * | 7/2003 | Temmyo et al. | 62/179 |
| 6,691,524 B2 | 2/2004 | Brooke | |
| 6,725,680 B1 | 4/2004 | Schnek et al. | |
| 6,769,265 B1 * | 8/2004 | Davis et al. | 62/228.4 |
| 6,772,601 B1 * | 8/2004 | Davis et al. | 62/187 |
| 6,779,353 B2 * | 8/2004 | Hu et al. | 62/180 |
| 6,857,287 B1 * | 2/2005 | Alsenz | 62/509 |

FOREIGN PATENT DOCUMENTS

| | | |
|---|---|---|
| JP | 5-196340 | 8/1993 |

* cited by examiner

VARIABLE SPEED REFRIGERATION SYSTEM

CROSS-REFERENCE TO RELATED APPLICATIONS

The present application claims the benefit of U.S. Provisional Patent Application Ser. No. 60/454,526 filed Mar. 14, 2003.

BACKROUND OF INVENTION

1. Field of Invention

The present invention pertains to the art of refrigerated appliances and, more particularly, to a refrigerator including variable speed refrigeration components for efficiently controlling compartment temperatures within the appliance.

2. Discussion of Prior Art

In general, a refrigerator includes a first or freezer compartment for maintaining foodstuffs at or below freezing, and a second or fresh food compartment, in fluid communication with the freezer compartment, for maintaining foodstuffs in a temperature zone between ambient and freezing temperatures. A typical refrigerator includes a refrigeration system having a compressor, a condenser coil, a condenser fan, an evaporator coil, and an evaporator fan.

In operation, temperature sensors are provided within the refrigerator to measure internal temperatures of the appliance. When a door associated with either compartment is opened, the temperature within the respective compartment will rise. When the internal temperature of the refrigerator deviates from a predetermined temperature, the refrigeration system is caused to operate such that the temperature will return to a point below a consumer selected set-point. In order to return the compartment temperature to this point, prior art systems operate at maximum capacity regardless of the degree of the deviation.

Another consideration is the size of the temperature zone. Prior art refrigerators typically establish a wide temperature zone or control band in order to minimize operation of the refrigeration system. A small temperature zone or control band results in extended operation, i.e., increased parasitic losses, of the system, thereby reducing energy efficiency.

To supplement compressor operation, a damper is located between an evaporator housing and the fresh food compartment. Operation of the damper is controlled such that, when required, cool air is permitted to flow from the evaporator to the fresh food compartment. In some arrangements, a fan is mounted within a housing adjacent to the evaporator to aid in establishing the air flow. Accordingly, if the temperature of the fresh food compartment rises above the set point, the damper is opened to allow the passage of cooling air from the evaporator compartment to the fresh food compartment. Unfortunately, this may result in operation of the compressor each time additional cooling air is required.

Earlier systems require running the refrigeration system at its maximum level in order to lower the temperatures in the compartments. As time progressed, systems were developed which varied the speed of one or another of the individual refrigeration components, e.g. the compressor, the condenser fan, and/or evaporator fan, depending upon the magnitude of the temperature deviation. Additionally, a fan may be incorporated into a plenum near or adjacent to the fresh food compartment to recirculate air within the compartment in order to reduce temperature stratification.

While these systems work to improve refrigeration efficiency, they have never been fully integrated so as to obtain a synergistic benefit, with each component being operated in a manner to minimize the overall energy consumption of the refrigerated appliance. Accordingly, there exists a need for a refrigeration system wherein numerous components are operated through an integrated control system in a manner which maximizes the efficiency and cooling effectiveness of the overall system.

SUMMARY OF THE INVENTION

A refrigerator constructed in accordance with the present invention is energy efficient, having a reduced noise output and minimal thermal stratification. In addition to the typical components found in a refrigerator, e.g. an insulated cabinet shell having a fresh food compartment and a freezer compartment, shelves for supporting food items, and typically drawers for storing fruit, vegetables and meats, the refrigerator of the present invention includes a variable speed refrigeration system capable of maintaining one or more of the compartments at a substantially constant temperature with minimal energy input.

To this end, the refrigerator of the present invention includes several variable speed components, i.e., a compressor, an evaporator fan, and a fresh food stirring fan. Additionally, a variable position damper is located within a duct connecting the fresh food and freezer compartments for controlling a flow of cooling air between the two compartments. The refrigeration components are interconnected to an electronic control system which receives signals from a plurality of sensors and functions to vary the speed of the components such that the refrigeration system operates to maintain the temperature of the compartments with minimum compartment temperature variations.

During normal usage, the refrigerator will be accessed several times a day through the opening and closing of at least one compartment door. This opening and closing results in a rise in an internal temperature of the appliance. When the internal temperature exceeds a predetermined limit, sensors send a signal representing the temperature change to the electronic control system. Based upon the magnitude of the temperature change, the electronic control system determines not only which component(s) require activation, but also the optimum speed at which the component(s) should be operated. Therefore, for example, a low cooling demand results in a low speed operation, a medium cooling requirement results in a medium speed operation, etc. However, the operation of the components are interdependent such that temperature control is performed in a synergistic manner. For instance, the operational speed of the compressor is established based on a sensed temperature in the freezer compartment. The operational speed of the evaporator fan is optimized based on sensed temperatures of the evaporator and the condenser, while being reduced in dependence upon the established speed for the compressor.

Based on the above, it is the manner in which multiple variable speed components are interrelated and operated in order to maximize operational efficiency to which the invention is directed. In any event, additional objects, features and advantages of the invention will become more readily apparent from the following detailed description of a preferred embodiment of the invention when taken in conjunction with the drawings wherein like reference numerals refer to corresponding parts in the several views.

DETAILED DESCRIPTION OF THE INVENTION

Figure 1:
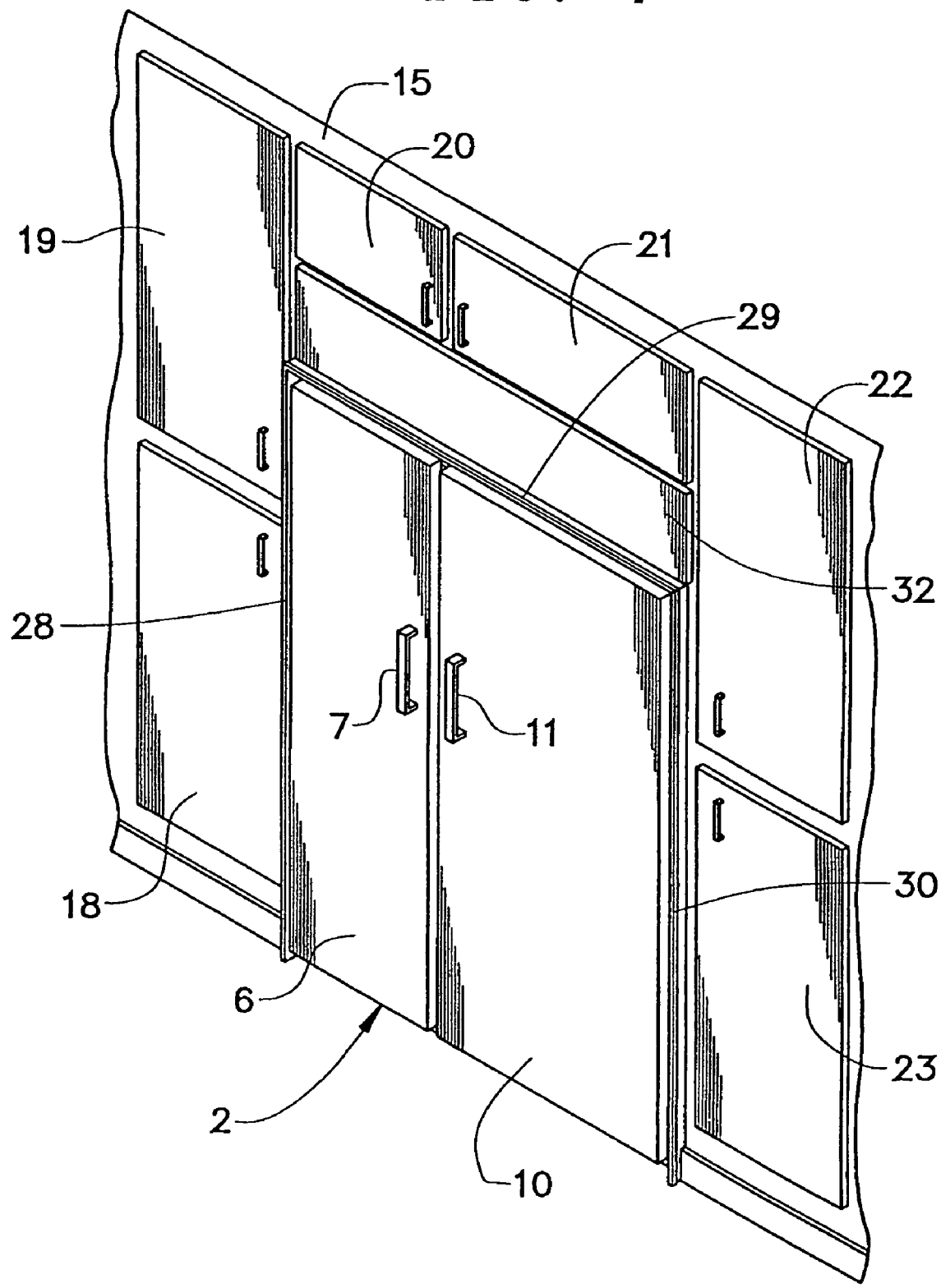
FIG. 1 is a perspective view of a refrigerator incorporating the variable speed refrigeration system of the invention.

With initial reference to FIG. 1, a refrigerator constructed in accordance with the present invention is generally shown at 2. Refrigerator 2 is shown to include a freezer door 6 having an associated handle 7 and a fresh food door 10 having an associated handle 11. In the embodiment shown, refrigerator 2 is of the recessed type such that, essentially, only freezer and fresh food doors 6 and 10 project forward of a wall 15. The remainder of refrigerator 2 is recessed within wall 15 in a manner similar to a plurality of surrounding cabinets generally indicated at 18-23. Refrigerator 2 also includes a plurality of peripheral trim pieces 28-30 to blend refrigerator 2 with cabinets 18-23. One preferred embodiment employs trim pieces 28-30 as set forth in pending U.S. patent application Ser. No. 10/385,607 entitled "Fastening System for Appliance Cabinet Assembly" filed on Mar. 12, 2003 and which is incorporated herein by reference. Finally, as will be described more fully below, refrigerator 2 is preferably designed with main components of a refrigeration system positioned behind an access panel 32 arranged directly above trim piece 29.

Figure 2:
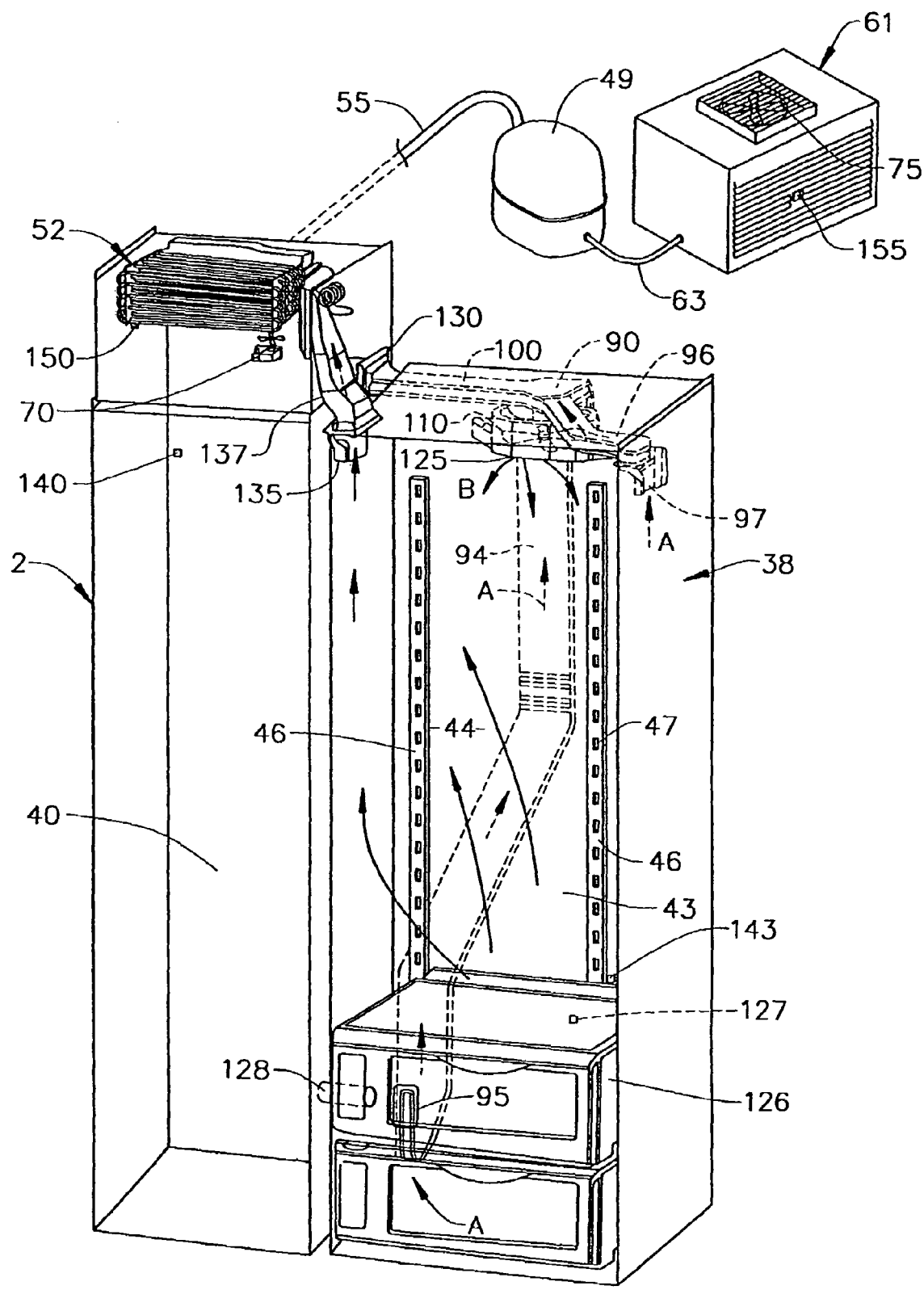
FIG. 2 is an exploded view showing the various components of the variable speed refrigeration system in accordance with a preferred embodiment of the present invention.

As shown in FIG. 2, refrigerator 2 includes a cabinet shell 38 defining a freezer compartment 40 and a fresh food compartment 43. For details of the overall construction of cabinet shell 38, reference is again made to pending U.S. patent application Ser. No. 10/385,607 entitled "Fastening System for Appliance Cabinet Assembly" filed on Mar. 12, 2003 and incorporated by reference. Shown arranged on a rear wall 44 of fresh food compartment 43 are a plurality of elongated metal shelf rails 46. Each shelf rail 46 is provided with a plurality of shelf support points, preferably in the form of slots 47, adapted to accommodate a plurality of vertically adjustable, cantilevered shelves (not shown) in a manner known in the art. Since the manner in which such shelves can vary and is not considered part of the present invention, the shelves have not been depicted for the sake of clarity of the drawings and will not be discussed further here. However, for purposes which will be set forth further below, it should be noted that each of rails 46 preferably extends from an upper portion, through a central portion, and down into a lower portion (each not separately labeled) of fresh food compartment 43.

Preferably mounted behind access panel 32 are components of the refrigeration system employed for refrigerator 2. More specifically, the refrigeration system includes a variable speed compressor 49 which is operatively connected to both an evaporator 52 through conduit 55, and a condenser 61 through conduit 63. Arranged adjacent to evaporator 52 is a variable speed evaporator fan 70 adapted to provide a variable airflow to evaporator 52. Similarly, arranged adjacent to condenser 61 is a condenser fan 75 adapted to provide an airflow across condenser 61. In accordance with the invention, each of the variable speed components is operated at a respective optimum speed based upon sensed cooling demand within refrigerator 2 as will be detailed fully below.

In addition to the aforementioned components, mounted to an upper portion of fresh food compartment 43 is an air manifold 90 for use in directing a cooling airflow through fresh food compartment 43 of refrigerator 2. More specifically, a first recirculation duct 94 having an inlet 95 exposed in a lower portion of fresh food compartment 43, a second recirculation duct 96 having an inlet 97 exposed at an upper portion of fresh food compartment 43, and an intake duct 100 establishing an air path for a flow of fresh cooling air from freezer compartment 40 into manifold 90. Arranged in fluid communication with air manifold 90 is a variable speed fresh food stirring fan 110. Stirring fan 110 is adapted to receive a combined flow of air from recirculation ducts 94 and 96, as well as intake duct 100, and to disperse the combined flow of air into the fresh food compartment 43. In accordance with the most preferred form of the invention, stirring fan 110 is continuously operated at all times door 6 is closed, but at variable speeds as will be detailed more fully below. With this arrangement, stirring fan 110 draws in a flow of air, which is generally indicated by arrows A, through inlets 95 and 97 of ducts 94 and 96, and intake duct 100, while subsequently exhausting the combined flow of cooling air, represented by arrow B, through outlet 125. Most preferably, outlet 125 directs the air flow in various directions in order to generate a desired flow pattern based on the particular configuration of fresh food compartment 43 and any additional structure provided therein. The exact positioning of inlets 95 and 97 also depend on the particular structure provided. In one preferred embodiment, inlet 95 of duct 94 is located at a point behind at least one food storage or specialty bin 126 arranged in a bottom portion of fresh food compartment 43 and having an associated temperature sensor 127. The air flow past the storage bin is provided to aid in maintaining freshness levels of food contained therein. For this purpose, an additional passage leading from freezer compartment 40 into fresh food compartment 43 can be provided as generally indicated at 128. While not part of the present invention, the details of the storage bin are described in U.S. Pat. No. 6,170,276 which is hereby incorporated by reference.

In order to regulate the amount of cooling air drawn in from freezer compartment 40, a variable position damper 130 is provided either at an entrance to or within intake duct 100. As will be discussed more fully below, when the cooling demand within fresh food compartment 43 rises, variable position damper 130 opens to allow cooling air to flow from freezer compartment 40 to fresh food compartment 43 and, more specifically, into intake duct 100 to manifold 90 and stirring fan 110. A flow of air to be further cooled at evaporator 52 is lead into an intake 135 of a return duct 137. In the embodiment shown, return duct 137 is preferably located in the upper portion of fresh food compartment 43.

In accordance with the invention, this overall refrigeration system synergistically operates to both maintain the temperature within fresh food compartment 43 at a substantially uniform temperature, preferably established by an operator, and minimizes stratification of the temperature in fresh food compartment 43. In order to determine the cooling demand within freezer compartment 40 and fresh food compartment 43, a plurality of temperature sensors are arranged throughout refrigerator 2. Specifically, a freezer temperature sensor 140 is located in freezer compartment 40, a fresh food compartment temperature sensor 143 is mounted on shelf rail 46, an evaporator coil temperature sensor 150 is mounted adjacent to evaporator 52, a sensor 155, which is preferably arranged in a position directly adjacent to an intake associated with condenser 61, is provided to measure the ambient air temperature, and temperature sensor 127 is associated with storage bin 126. As indicated above, shelf rails 46 are preferably made of metal, thereby being a good conductor. As will become more fully evident below, other high conductive materials could be employed. In addition, shelf rails preferably extend a substantial percentage of the overall height of fresh food compartment 43. In this manner, the temperature sensed by sensor 143 is representative of the average temperature within fresh food compartment 43. Certainly, an average temperature reading could be obtained in various ways, such as by averaging various temperature readings received from sensors located in different locations throughout fresh food compartment 43. However, by configuring and locating sensor 143 in this manner, an average temperature reading can be obtained and the need for further, costly temperature sensors is avoided.

Figure 3:
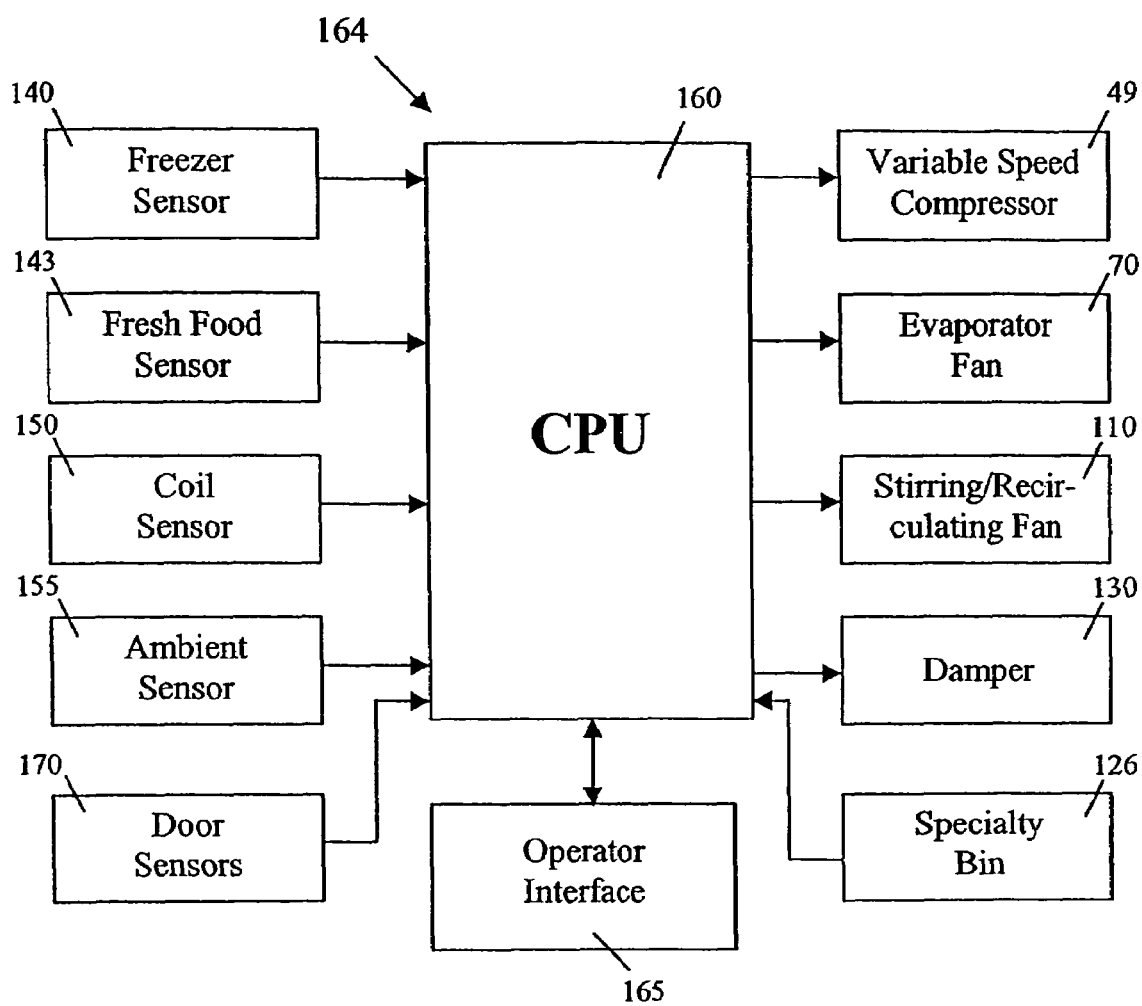
FIG. 3 is a block diagram depicting the interrelationships of the control system components of the preferred embodiment of the invention.

As shown in FIG. 3, a controller or CPU 160, forming part of an overall control system 164 of refrigerator 2, is adapted to receive inputs from each of the plurality of temperature sensors 140, 143, 150 and 155, as well as operator inputs from an interface 165, door opening signals generated by door sensors 170, and signals from specialty bin 126. Accordingly, CPU 160 functions to regulate operational speeds of the compressor 49, evaporator fan 70, and stirring fan 110, as well as the position for damper 130, in order to maintain a desired temperature throughout fresh food compartment 43. At this point, it should be noted that interface 165 can take various forms in accordance with the invention. For instance, interface 165 could simply constitute a unit for setting a desired operating temperature for freezer compartment 40 and/or fresh food compartment 43, such as through the use of push buttons or a slide switch. In one preferred form of the invention, although not shown in FIG. 1, interface 165 is constituted by an electronic control panel mounted on either door 6 or 10 to enter desired operating temperatures and a digital display to show temperature set points and/or actual compartment temperatures. The display could incorporate a consumer operated switch to change the displays from ° F. to ° C. and vise versa, various alarm indications, such as power interruption and door ajar indicators, service condition signals and, in models incorporating water filters, a filter change reminder. In any event, it is simply important to note that various types of interfaces could be employed in accordance with the invention.

In general, temperature fluctuations within refrigerator 2 can cover a broad spectrum. During a typical day, the doors 6 and 10 of refrigerator 2 can be opened several times and for varying periods of time. Each time a door 6, 10 is opened, cold air escapes from a respective compartment 40, 43 and the temperature within the compartment 40, 43 is caused to rise. Of course, a temperature change can also occur in dependence upon the use of specialty bin 126. A certain temperature rise will necessitate the activation of the refrigeration system in order to compensate for the cooling loss. However, each door opening does not release the same amount of cold air, and therefore a uniform level of temperature compensation will not be needed. Accordingly, control system 164 determines the required cooling load and maintains the temperature in fresh food compartment 43 within a predetermined, small temperature range by regulating operational speeds of each of the compressor 49, evaporator fan 70, and stirring fan 110, along with establishing an appropriate position for damper 130. That is, CPU 160 regulates the operational speeds and establishes the proper damper position interdependently, as will be detailed below, thereby obtaining synergistic results for the overall temperature control system. In fact, it has been found that fresh food compartment 43 can be reliably maintained within as small a temperature range as 1° F. from a desired set point temperature in accordance with the invention.

As indicated above, temperature sensor 143 monitors the average temperature at shelf rail 46 and sends representative signals to CPU 160 at periodic intervals to reflect an average temperature within fresh food compartment 43. CPU 160 preferably takes a derivative of the sensed temperatures to develop a temperature gradient or slope representative of a rate of change of the temperature within fresh food compartment 43. Based upon the steepness of the slope, CPU 160 regulates the operational speed of stirring fan 110, i.e., the steeper the slope, the faster stirring fan 110 operates. In accordance with the most preferred form of the invention, this derivative is taken approximately every 15-30 seconds.

If, however, the temperature cannot be compensated for by operation of stirring fan 110 alone, CPU 160 will send a signal to operate variable position damper 130. Based upon the magnitude of the signal, damper 130 will open to allow an appropriate amount of additional cooling air to flow into fresh food compartment 43 from freezer compartment 40. Therefore, the position of damper 130 is established based on the temperature in fresh food compartment 43 as measured by sensor 143. Damper 130 will be maintained in an open position until temperature sensor 143 sends a signal to CPU 160 indicating the average temperature within fresh food compartment 43 has returned to the desired level, but can be slowly closed when the temperature in fresh food compartment 43 is heading toward the correct, set point direction.

Of course, there will be requirements for additional cooling to be performed within freezer compartment 40 in order to enable lower temperature air to flow through intake duct 100. In these times, CPU 160 will operate compressor 49 and evaporator fan 70 at optimum operational speeds. Specifically, CPU 160 regulates the operation of variable speed compressor 49 based solely on the temperature in freezer compartment 40 as relayed by sensor 140, as well as the operator setting for a desired operating temperature for fresh food compartment 43 as received from interface 165. Based upon the magnitude of the temperature deviation, compressor 49 will be operated at a speed, determined by the CPU to minimize energy usage, to rapidly return the temperature within freezer compartment 40 to within a pre-selected range based on the operator setting.

In addition to maximizing the energy efficiency when operating compressor 49, CPU 160 also controls the speed of evaporator fan 70. The control of evaporator fan 70 is based upon the temperatures sensed by evaporator temperature sensor 150 arranged at the coils of evaporator 52 and ambient temperature sensor 155 located at the intake for condenser 61. Preferably, the speed for evaporator fan 70 is maximized by CPU 160. However, the actual operational speed employed for evaporator fan 70 is further dependant upon the operational speed established for compressor 49. More specifically, the maximized operational speed for evaporator fan 70 will be reduced based on the operational speed established for compressor 49. Therefore, if the temperature signal in freezer compartment 40 warrants compressor 49 operating at a relatively low speed, the operational speed of evaporator fan 70 will be correspondingly reduced. In this fashion, energy is conserved and noise to the surrounding areas is reduced.

Based on the above, it should be readily apparent that the invention provides for a variable speed refrigeration system of the type which enables refrigerator compartments to be maintained at desired temperatures with little variations, minimizes and makes efficient use of energy, and addresses reducing the amount of noise emitted to the surroundings. Even though the variable components are controlled individually through CPU 160, CPU 160 operates them collectively and in an interdependent manner such that synergistic results are obtained. Therefore, refrigerator 2 constructed in accordance with the present invention reduces the amount of energy consumed as compared to similar appliances. A quick opening of a compartment door will not require the refrigeration system to operate at full speed to compensate for the temperature loss. Instead, any temperature variations are continuously addressed by the operation of one or more of the variable speed components such that even slight temperature deviations are appropriately compensated in a substantially proactive fashion. In this manner, and with the continual operation of the stirring fan as well as the overall ducting arrangement employed, temperature stratification within the fresh food compartment is substantially eliminated, and a uniform temperature can be maintained throughout the compartment. In any event, although described with reference to a preferred embodiment, it should be understood that various changes and/or modifications can be made to the invention without departing from the spirit thereof. Instead, the invention is only intended to be limited by the scope of the following claims.

We claim:

1. A refrigerator comprising:
   a cabinet shell including a fresh food compartment and a freezer compartment;
   a passage for fluidly interconnecting said fresh food compartment with said freezer compartment;
   a variable position damper provided in the passage for directing a flow of cooling air to the fresh food compartment from the freezer compartment;
   a refrigeration system for cooling at least the freezer compartment, said refrigeration system including a compressor, a condenser, an evaporator, an evaporator fan, and a fresh food compartment air stirring fan positioned in the fresh food compartment, each of said compressor, evaporator fan and stirring fan being operable at varying speeds;
   a plurality of sensors including a freezer compartment temperature sensor, an evaporator temperature sensor, a fresh food compartment sensor and an ambient temperature sensor for detecting various operating parameters of the refrigerator; and
   a control system for altering a position of the damper and varying an operational speed of each of the compressor, evaporator fan and stirring fan based on signals received from the plurality of sensors, said control system optimizing the operational speed of the evaporator fan based on signals received from the evaporator temperature sensor and the ambient temperature sensor.

2. The refrigerator according to claim 1, wherein one of the plurality of sensors constitutes a temperature sensor mounted within the freezer compartment for sensing a freezer compartment temperature.

3. The refrigerator according to claim 2, wherein the control system varies the operational speed of the compressor based upon the freezer compartment temperature.

4. The refrigerator according to claim 3, further comprising: means for an operator to select a desired operating temperature, wherein the control system varies the operational speed of the compressor based solely upon the freezer compartment temperature and the desired operating temperature.

5. The refrigerator according to claim 1, wherein the ambient temperature sensor is positioned directly adjacent to said condenser.

6. The refrigerator according to claim 1, wherein said control system reduces the operational speed of the evaporator fan based on a reduction in the operating speed of the compressor.

7. The refrigerator according to claim 6, further comprising: means enabling an operator to select a desired operating temperature for the refrigerator, wherein the control system varies the operational speed of the compressor based solely upon the freezer compartment temperature and the desired operating temperature.

8. The refrigerator according to claim 1, wherein the refrigeration system, except for the stirring fan, is mounted above the cabinet shell.

9. A refrigerator comprising:
   a cabinet shell including a fresh food compartment and a freezer compartment, said fresh food compartment being adapted to be placed in fluid communication with said freezer compartment;
   a refrigeration system including a compressor, condenser, evaporator coil, an evaporator fan, and a fresh food compartment air stirring fan, each of said compressor, evaporator fan and stirring fan being operable at varying speeds;
   an evaporator coil temperature sensor for detecting a temperature of the evaporator coil;
   an ambient air temperature sensor for detecting a temperature of the ambient air; and
   a control system for regulating the refrigeration system, said control system establishing an operational speed of the evaporator fan based on signals received from the evaporator coil temperature sensor and the ambient air temperature sensor.

10. The refrigerator according to claim 9, wherein said control system maximizes the operational speed of the evaporator fan based on the signals received from the evaporator coil temperature sensor and the ambient air temperature sensor.

11. The refrigerator according to claim 10, wherein said control system reduces the operational speed of the evaporator fan based on a reduction in the operating speed of the compressor.

12. The refrigerator according to claim 9, further comprising:
    a freezer compartment temperature sensor for sensing a freezer compartment temperature; and
    means enabling an operator to select a desired operating temperature for the refrigerator, wherein the control system varies an operational speed of the compressor based solely upon the freezer compartment temperature and the desired operating temperature.

13. The refrigerator according to claim 9, wherein the entire refrigeration system, except the stirring fan, is mounted above the cabinet shell.

14. A method of controlling a refrigeration system, including a variable speed compressor, an evaporator, and a variable speed evaporator fan, for developing a flow of cooling air within a compartment of a refrigerator comprising:

sensing a temperature in the compartment;

sensing an ambient temperature;

sensing a temperature at coils of the evaporator;

determining a desired operating temperature for the refrigerator based on a setting selected by an operator of the refrigerator;

varying an operational speed of the compressor based on the desired operating temperature and the temperature in the compartment; and varying an operational speed of the evaporator fan based on the temperature at the coils of the evaporator and the ambient temperature.

15. The method of claim 14, further comprising: varying the operational speed of the compressor solely on the desired operating temperature and the temperature in the compartment.

16. The method of claim 14, further comprising:

reducing the operational speed of the evaporator fan based on the operational speed of the compressor.

17. The method of claim 14, further comprising:

controlling the refrigeration system based on opening signals for at least one door of the refrigerator.

* * * * *